United States Patent Office 3,264,645
Patented August 2, 1966

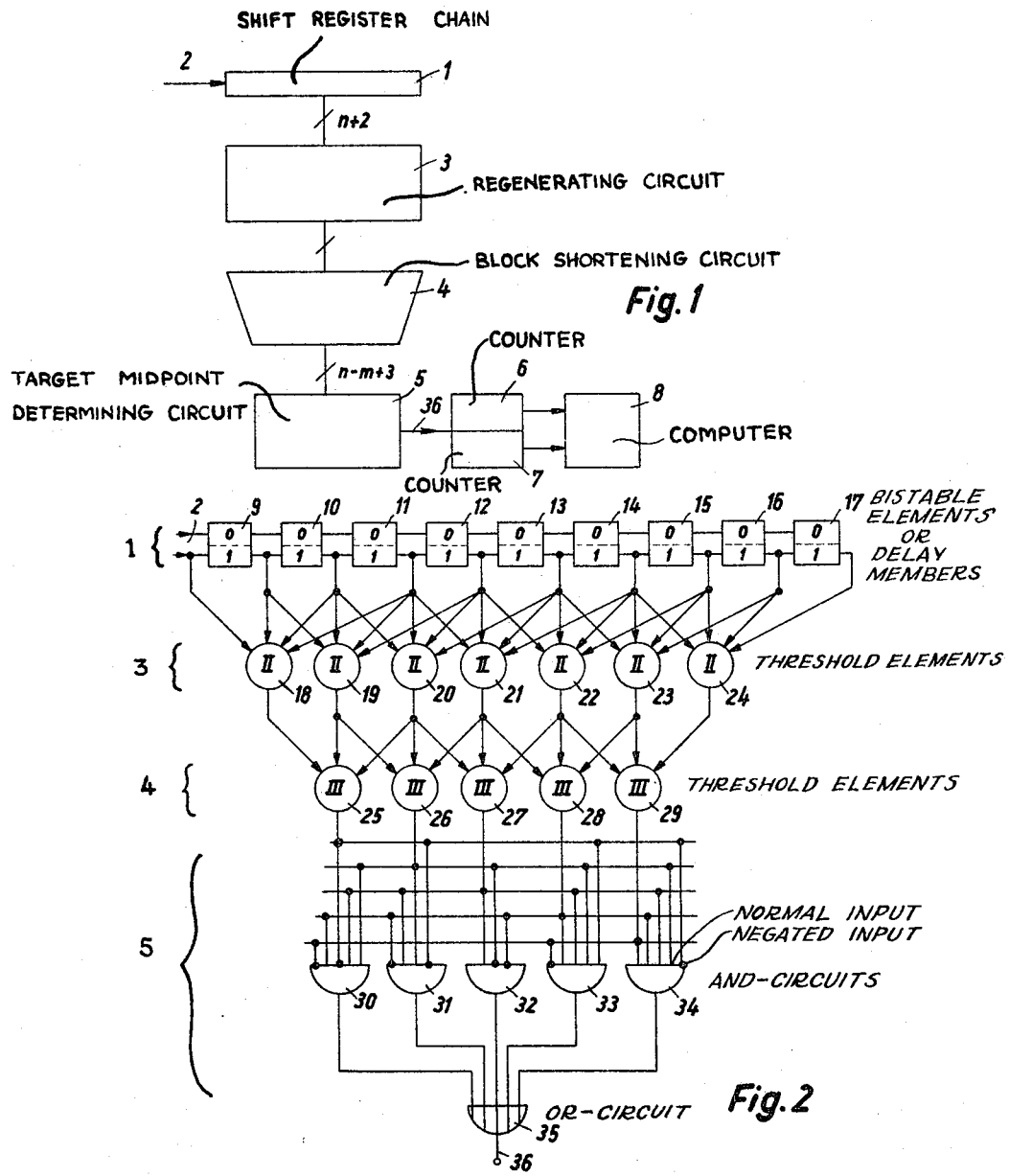

3,264,645
CIRCUIT ARRANGEMENT FOR PROCESSING DIGI-
TALIZED RADAR PULSE ECHO SEQUENCES
Günter Hotz, Konstanz (Bodensee), Germany, assignor to
Telefunken Patentverwertungs-G.m.b.H., Ulm (Dan-
ube), Germany
Filed Oct. 18, 1962, Ser. No. 232,661
Claims priority, application Germany, Oct. 18, 1961,
T 20,979
15 Claims. (Cl. 343—17.1)

The present invention relates to the radar art.

More particularly, the present invention relates to the automatic processing of radar information.

In order to allow the pulse sequence of incoming radar signals to be evaluated and analyzed, the sequence has to be digitalized and applied to a data processing unit which differentiates the true target echos from spurious echos, such as noise, and from stationary targets, so that a set of coordinates, such as the azimuth and distance of the target, can be related to the true target. While it is known to do this in an appropriately programmed computer, it has been found to be such a complicated problem, which moreover has to be solved in the very short time intervals available between the incoming true echo pulses, that exceedingly large and expensive computer installations are required.

It is, therefore, an object of the present invention to overcome this drawback, namely, to provide a circuit arrangement for processing incoming digitalized radar pulse sequences, which circuit arrangement is specifically suited for the task at hand which can thereby be reduced to practice very easily. More particularly, a circuit arrangement according to the present invention determines the midpoint of a true target or of a stationary target after noise signals have been suppressed.

Due to the finite lobe width of the radiation pattern of a radar antenna, each reflection point will be received as a series of echo pulses, hereinafter referred to as a block, whereas signals due to noise will appear as individual pulses. The noise, however, may cause true target echos to be absent from a block. In order to avoid this, a system may be provided for regenerating interrupted pulse sequences, which system makes use of so-called digital threshold elements and eliminates individual ONE-digits or ZERO-digits from the digital pulse sequence. Such a system is shown in my copending application Serial No. 222,462, filed September 10th, 1962.

For purposes of the present invention, it will be assumed that the received digitalized radar signal pulse sequence is properly correlated so as to pertain to targets located within predetermined distance rings, so that any one block of target signals will not include signals pertaining to a target located in another distance ring. This can be done either by limiting the receipt of incoming signals to a single region spaced a given distance from the radar installation, or by temporarily storing the incoming information on a rotating magnetic drum and reading out this information in such a manner as to maintain the proper correlation with respect to distance.

The length of the regenerated blocks of targets, i.e., the number of individual pulses within a block, does not, however, depend solely on the antenna characteristics, but also on the signal noise and the regeneration. It is also possible that two target blocks come so close to each other as to form but a single block. Accordingly, a system according to the present invention will provide blocks of different lengths, i.e., blocks containing different numbers of echo pulses, and relate them to one or two targets, and the respective target midpoints are then fixed. This is done by applying the digitalized pulse sequences, properly correlated with respect to distance, to the input of a shift register chain. For purposes of determining the target midpoints, the outputs of the register elements are connected to a logic network at whose output there will appear the output signal value ONE only when there is a block having a maximum of $n$ ONE-digits in the middle of the register ($n$ being the number of the binary digits of the longest block pertaining to a respective target), or when the chronologically first ONE-digit of a larger block of ONE-digits, resulting from two targets, has reached a given reference element of the chain which is remote from the input, or when the last ONE-digit of such a block has reached a given reference element near the input.

According to another feature of the present invention, there is arranged between the register chain and the logic network for determining the target midpoints, a device for reducing the size of the blocks of ONE-digits, in which device all of the blocks of ONE-digits are reduced by $m-1$ digits, $m$ being the number of digits of the block of ONE-digits which is to be interpreted as a true signal. Such a device will preferably consist of a network of AND-circuits or of threshold elements whose threshold value is selected to be almost equal to the number of inputs of one threshold element.

Additional objects and advantages of the present invention will become apparent upon consideration of the following description when taken in conjunction with the accompanying drawings in which:

FIGURE 1 is a block diagram of a data processing arrangement according to the present invention.

FIGURE 2 is a schematic diagram showing the details of certain ones of the components depicted in FIGURE 1.

Referring now to the drawings and to FIGURE 1 thereof in particular, the same shows a shift register chain 1 having an input 2 to which there is applied a series of digitalized radar pulse sequences which are properly correlated with respect to distance rings. The register comprises at least $n+2$ elements and therefore $n+2$ outputs. The outputs are applied to a circuit 3 for regenerating interrupted pulse sequences. The regenerated pulse sequence is then applied to a further circuit 4 for decreasing the size of the blocks of ONE-digits, each block being made smaller to such an extent that the smallest block which is still to be interpreted as a block pertaining to a target has but a single ONE-digit. The largest block pertaining to a target will thus have only $n-m+1$ binary digits. The circuit 5, which determines the target midpoints, has $n-m+3$ inputs and but one output 36 at which there will appear a signal only when a target block, which has been reduced in size, has been applied to the middle inputs of the circuit 5, or when the two target midpoints of a block pertaining to two targets have been determined. The output 36 is applied to two counters 6 and 7 which continuously count the azimuth and distance, and which, when there appears a signal at the output 36 of circuit 5, pass their contents on to a computer 8 where the information is processed further.

The arrangement described above is thus able to determine, from an incoming radar pulse sequence which is correlated with respect to distance rings, a pair of values representing the target coordinates. If desired, intermediate storage registers can be interposed between the circuits 3, 4, and 5, in which case the counters 6 and 7 would have to be appropriately pre-set. The circuits 3 and 4 can therefore be so arranged that each has but one output which is applied to further shift registers, connected so as to function as input registers of the following circuit. Nor need the shift register chain 1 necessarily be a circuit of the type which is generally understood by this nomenclature, since this component 1 can be constituted by a cyclically addressable storage device operating in conjunction with a storage register.

FIGURE 2 shows the details of the above-described circuits 1, 3, 4 and 5.

The shifting chain 1 comprises nine register elements 9, 10, 11, 12, 13, 14, 15, 16, 17, each of which is a conventional bistable element or delay member, the outputs of which are connected to the respective following elements. Each element has a normal output and a complementary output. The normal outputs of all of the elements of the chain members are connected with the inputs of threshold elements 18, 19, 20, 21, 22, 23, 24, the latter constituting the regenerating circuit 3 for regenerating pulse sequences. The threshold elements, known per se, are passive logic elements which are activated if a predetermined number of inputs are activated. Except in the limit case in which the logic element is, in effect, an ordinary AND-gate which passes a signal only if all of the inputs are correctly activated (that is to say, there being a signal applied to the normal inputs and no signal applied to the negated inputs), the number of inputs which have to be activated in a threshold element is smaller than the total number of inputs. For instance: if the threshold element is an AND-circuit having five inputs and a threshold "3," the gate will pass the signal upon the application of a signal to three of the inputs, it being immaterial which three inputs are the ones that are activated. In the instant embodiment, each threshold element 18 through 24 is provided with four inputs and has a threshold value 2 (indicated in Roman numerals). Each threshold element is connected to the outputs of four consecutive chain elements, the input 2 of the chain 1 serving as the output of the zero element. At the outputs of the threshold elements there will appear what is substantially the same as the input sequence, there being, however, a very high probability of noise elimination.

The size reducing circuit 4 comprises threshold elements 25, 26, 27, 28, 29, whose threshold, however, is relatively high. In the illustrated embodiment, this threshold value is, for the sake of simplicity, selected to be the limit of the AND-circuit (the number of inputs =the threshold value), namely, III, as again shown by Roman numerals. As is well known, such a circuit is able to decrease the size of, i.e., shorten, the blocks of ONE-digits, the extent to which this shortening occurs being dependent on the circuit connections. In practice, it will be expedient to connect the circuit such that the smallest target block which can still be differentiated from noise, appears as a ONE-digit. In the instant embodiment, the largest block pertaining to a target is to contain two binary digits more than the smallest, hence, such a block should, after shortening, consist of at most three binary digits. Each block which is larger than three binary digits will, by agreement, be processed as a double target.

This processing is carried out by the circuit 5 which determines the target midpoints and which comprises five AND-circuits 30, 31, 32, 33, 34, whose outputs are connected to an OR-circuit 35 having the output 36. The various inputs to the five AND-circuits are either normal or negated inputs, the later being represented by the heavy dot which marks the intersection of the input line with the diameter of the semi-circle depicting the respective AND-circuit. (This is the notation used, for example, in "Digital Computer Principles" by Wayne C. Irwin, 1960, D. van Nostrand Co. Inc. New York, chapter 17.) Thus, each respective AND-gate will produce an output signal only if appropriate input signals are applied to all of the inputs. For example, AND-gate 30 will put out a signal only if signals are applied to the second, fourth and fifth inputs (reading from left to right) and if no signal is applied to the first and third inputs.

The outputs of the threshold elements 25 through 29 are interconnected with the inputs—both normal and negated—of AND-gates 30 through 34, as shown in FIGURE 2, and this results in there being one AND function output signal for each of the following five cases:

(1) There is a single ONE-digit in the middle threshold element 27 of the circuit 4 (AND-circuit 32).

(2) There are exactly two ONE-digits appearing at the outputs of elements 26 and 27 (AND-circuit 31).

(3) There are exactly three ONE-digits at the middle elements 26, 27, 28 (AND-circuit 30).

(4) A block pertaining to two targets has its chronologically first ONE-digit at the second-from-the-front element 28 (AND-circuit 33).

(5) A block pertaining to two targets has its chronologically last ONE-digit at the penultimate element 26 (AND-circuit 34).

As a result, there will appear an output signal at output 36 of OR-circuit 35 only when one of the five above-described conditions is fulfilled. In this way, a single target midpoint is determined for target blocks of different widths, insofar as such blocks pertain to a single target, while for target blocks pertaining to two targets, it is the start and finish of such blocks which is determined, i.e., there will be an output signal appearing at 36 when the chronologically first ONE-digit of a block has reached a given element of the chain which is remote from the input 2 or when the chronologically last ONE-digit has reached a given element near this input. Each such element of the chain may thus be termed a "reference" element. Here it is assumed that such targets will produce approximately constant block widths, which, in practice, is the case.

It will be understood that the above description of the present invention is susceptible to various modifications, changes, and adaptations, and the same are intended to be comprehended within the meaning and range of equivalents of the appended claims. For example, if the received pulse sequence is noise-free, the circuit 3 can be dispensed with. Similarly, the circuit 4 can be dispensed with if the circuit 5 is sufficiently large, particularly when—for any one of a number of practical reasons—it is permissible to let the AND-circuits 30, 31, 32, 33, 34, 35, have a larger number of inputs. Furthermore, the circuits 3 and 4 will, in practice, be such that the regeneration and shortening action thereof can be improved, or made adjustable. As already stated above, a register or a shifting register can be interposed between the various circuits, for purposes of intermediate storage as well as for insulating the potentials. All that this requires is that the midpoint information appearing at output 36 be shifted by a few cycles, which can easily be compensated for by appropriately pre-setting the counters 6 and 7.

What is claimed is:

1. A circuit arrangement for processing digitalized radar pulse echo sequences wherein targets are represented by blocks of binary ONE-digits, which blocks are of different lengths but have a maximum length of $n$ digits, and wherein the blocks are correlated so as to pertain to targets located within predetermined distance rings, the combination which comprises:

(a) a shift register having a chain of register elements, there being at one end of said chain an input for receiving the digitalized and correlated blocks; and (b) a logic circuit having inputs connected to the outputs of said register elements for producing an output signal only when there appears in the middle of said shift register chain a block having a maximum of $n$ ONE-digits, or when there is in said shift register chain a larger block of ONE-digits, resulting from two targets, whose chronologically first ONE-digit has reached a given reference element which is remote from said input of said chain or whose chronologically last ONE-digit has reached a given reference element which is near said input, whereby the target midpoints are determined.

2. The combination defined in claim 1 wherein said shift register chain comprises $n+2$ elements, and wherein the outputs of said elements are connected directly with said inputs of said logic circuit.

3. The combination defined in claim 2 wherein said shift register elements are bistable elements.

4. The combination defined in claim 2 wherein said shift register elements are delay members.

5. The combination defined in claim 1, further comprising circuit means interposed between the outputs of said shift register elements and said inputs of said logic circuit for shortening the blocks of ONE-digits.

6. The combination defined in claim 5 wherein said circuit means shorten all blocks by $m-1$ digits, $m$ being the number of digits of the smallest block of ONE-digits which is to be interpreted as a true target.

7. The combination defined in claim 6 wherein said circuit means are connected via $n-m+3$ channels to the input of said logic circuit.

8. The combination defined in claim 5 wherein said circuit means are composed of AND-circuits.

9. The combination defined in claim 5 wherein said circuit means are composed of threshold elements whose threshold value is at least almost equal to the number of inputs of one threshold element.

10. The combination defined in claim 5, further comprising a regenerating circuit interposed between the output of said shift register chain and the input of said circuit means for regenerating interrupted pulse sequences.

11. The combination defined in claim 10 wherein said regenerating circuit is composed of OR-circuits.

12. The combination defined in claim 10 wherein said regenerating circuit is composed of threshold elements whose threshold value is low with respect to the number of inputs of one threshold element.

13. The combination defined in claim 5 wherein said logic circuit comprises $n-m+3$ AND-circuits whose outputs are connected to an OR-circuit, the first and the last AND-circuit of said logic circuit being connected to read the beginning and the end, respectively, of a block pertaining to two targets, the remainder of said AND-circuits being connected to be responsive to blocks which are of different respective digital lengths and which pertain to single targets when such a block occupies a predetermined position within said chain.

14. The combination defined in claim 13 wherein said predetermined position is a symmetrical one.

15. In a circuit arrangement for processing digitalized radar pulse echo sequences wherein targets are represented by blocks of binary ONE-digits which blocks are of different lengths but have a maximum of $n$ digits, the improvement that the pulse echo blocks, which are digitalized and which are correlated so as to pertain to targets located within predetermined distance rings, are applied to the input end of a chain of shift register elements, and that, for purposes of determining the target midpoints, the outputs of said shift register elements are connected to a circuit at whose output there appears a ONE only when there appears in the middle of the shift register chain a block having a maximum of $n$ ONE-digits, or when there is in the shift register chain a larger block of ONE-digits, resulting from two targets, whose chronologically first ONE-digit has reached a reference element which is remote from the input of said chain or whose chronologically last ONE-digit has reached a reference element which is near the input of the chain.

No references cited.

CHESTER L. JUSTUS, *Primary Examiner.*

P. M. HINDERSTEIN, *Assistant Examiner.*